(12) United States Patent
Schauder

(10) Patent No.: US 6,383,439 B1
(45) Date of Patent: May 7, 2002

(54) CHEMICALLY MODIFIED ELASTOMERS AND BLENDS THEREOF

(75) Inventor: Jean-Roch H. Schauder, Machelen (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/214,779

(22) PCT Filed: Aug. 8, 1997

(86) PCT No.: PCT/EP97/04409

§ 371 Date: May 24, 1999

§ 102(e) Date: May 24, 1999

(87) PCT Pub. No.: WO98/07769

PCT Pub. Date: Feb. 26, 1998

(30) Foreign Application Priority Data

Aug. 21, 1996 (GB) .............................................. 9617507

(51) Int. Cl.[7] .............................................. B29C 49/00
(52) U.S. Cl. .................... 264/454; 524/504; 525/64; 525/65; 525/69
(58) Field of Search ................. 525/191, 193, 525/64, 65, 69; 264/454; 524/504

(56) References Cited

U.S. PATENT DOCUMENTS

| | | |
|---|---|---|
| 3,326,917 A | 6/1967 | Freimiller et al. |
| 4,668,834 A | 5/1987 | Rim et al. |
| 4,722,971 A | 2/1988 | Datta et al. |
| 4,950,541 A | 8/1990 | Tabor et al. |
| 5,017,714 A | 5/1991 | Welborn, Jr. |
| 5,055,438 A | 10/1991 | Canich |
| 5,096,867 A | 3/1992 | Canich |
| 5,153,157 A | 10/1992 | Hlatky et al. |
| 5,198,401 A | 3/1993 | Turner et al. |
| 5,240,894 A | 8/1993 | Buckhardt et al. |
| 5,264,405 A | 11/1993 | Canich |
| 5,310,806 A | 5/1994 | Wild et al. |
| 5,324,800 A | 6/1994 | Welborn, Jr. et al. |
| 5,346,963 A | 9/1994 | Hughes |
| 5,451,639 A | 9/1995 | Marczinke et al. |
| 5,461,113 A | 10/1995 | Marczinke et al. |
| 5,507,475 A | 4/1996 | Seel et al. |
| 5,648,423 A | 7/1997 | Kagami et al. |
| 5,663,229 A | 9/1997 | Presenz et al. |
| 5,670,575 A | 9/1997 | Flexman, Jr. |
| 5,696,213 A | * 12/1997 | Schiffino et al. ............. 526/158 |

FOREIGN PATENT DOCUMENTS

| | | |
|---|---|---|
| CA | 1 268 753 | 5/1990 |
| EP | B-0-072480 | 2/1983 |
| EP | 0 129 368 B1 | 12/1984 |
| EP | B-0-207388 | 1/1987 |
| EP | B-0-220160 | 4/1987 |
| EP | B-0-261748 | 3/1988 |
| EP | 0 274 744 A3 | 7/1988 |

(List continued on next page.)

OTHER PUBLICATIONS

"Ethylene/Alpha–Olefin Copolymer TAFMER A/P", Mitsui Petrochemical, pp. 1–16, 9107.

(List continued on next page.)

*Primary Examiner*—Jeffrey Mullis
(74) *Attorney, Agent, or Firm*—Frank Reid; Paige Schmidt

(57) ABSTRACT

This invention relates to grafted ethylene-higher α-olefin polymers and blends thereof. Preferred grafted ethylene-higher α-olefin polymers are multimodal EPDM's having 5–40 weight % of a higher molecular weight, higher ethylene content, lower diene content fraction grafted with maleic anhydride. These polymers can then be used as modifiers for additional polymers such as polyamides, polyesters, and other EPDM's.

7 Claims, 5 Drawing Sheets

FOREIGN PATENT DOCUMENTS

| | | |
|---|---|---|
| EP | 0 277 003 A1 | 8/1988 |
| EP | 0 277 004 A1 | 8/1988 |
| EP | B-0-227206 | 6/1989 |
| EP | B-0-319339 | 6/1989 |
| EP | B-0-346837 | 12/1989 |
| EP | A-0-375389 | 6/1990 |
| EP | 0 440 506 B1 | 8/1991 |
| EP | 0 506 095 B1 | 9/1992 |
| EP | 0 520 732 A1 | 12/1992 |
| EP | A-0-535849 | 4/1993 |
| EP | 0 545 902 A2 | 6/1993 |
| EP | 0 722 983 A1 | 7/1996 |
| EP | 0 735 060 A2 | 10/1996 |
| EP | 0 754 731 A3 | 4/1998 |
| JP | 4220409 | 10/1942 |
| JP | 09087476 A | 3/1997 |
| WO | WO 92/00333 | 1/1992 |
| WO | WO 93/15150 | 8/1993 |
| WO | WO 94/03506 | 2/1994 |
| WO | WO 95/04781 | 2/1995 |
| WO | WO 96/28486 | 9/1996 |
| WO | WO 97/11120 | 3/1997 |
| WO | WO 97/27259 | 7/1997 |

OTHER PUBLICATIONS

*Research Disclosure*, No. 337, May 1, 1992 –p. 421, "Impact Modification of Nylon 6,6 and of Nylon 6 with a Combination of Impact Modifiers".

*Liquid Chromatography of Polymers and Related Materials III*, J. Cazes, ed., Marcel Dekker, New York (1981), pp. 207–235—On Line Determination by Light Scattering of Mechanical Degradation in the GPC Process by J.G. Rooney and G. Ver Strate.

Ver Strate, Gary—"Ethylene–Propylene Elastomers" – *Encyclopedia of Polymer Science and Engineering*, vol. 6, John Wiley & Sons, New York (1986) –pp. 522–564.

ASTM D792 –"Standard Test Methods for Density and Specific Gravity (Relative Density) of Plastics by Displacement"–American Society for Testing and Materials, (Date Unknown).

ASTM D3835—"Standard Test Methods for Determination of Properties of Polymeric Materials by Means of a Capillary Rheometer"—American Society for Testing and Materials, (Date Unknown).

ASTM D1238 –"Standard Test Methods for Flow Rates of Thermoplastics by Extrusion Plastomer"–American Society for Testing and Materials, (Date Unknown).

* cited by examiner

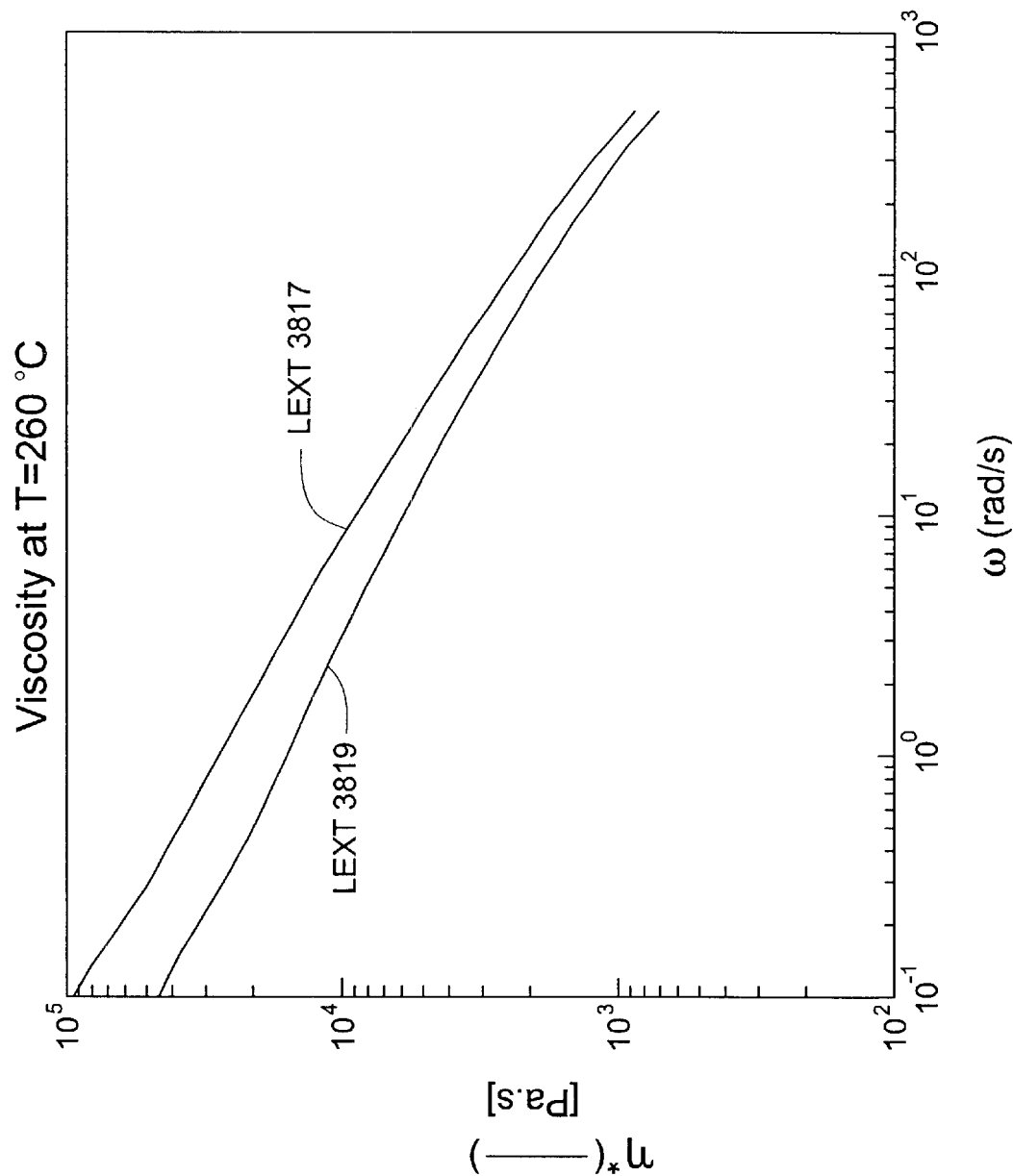

CHEMICALLY MODIFIED ELASTOMERS AND BLENDS THEREOF

FIELD OF THE INVENTION

This invention relates to chemically modified elastomers, blends thereof and processes to produce them.

BACKGROUND OF THE INVENTION

Ethylene-Propylene copolymers and Ethylene-Propylene Diene Monomer (EP(D)M's) elastomers have been modified by various agents in the past to improve their properties and compatibilities with other polymers. In particular, EP(D)M's were typically grafted with unsaturated carbonyl derivatives to improve their compatibility to thermoplastics such as polyamides (as taught in U.S. Pat. No. 3,972,961). Thermoplastic components, particularly polyamide components, have been recently introduced in the automotive industry to replace metallic parts. These components, made of high molecular weight thermoplastics are generally glass filled and produced by blow molding. In general, thermoplastics are limited by processing problems. For example, polyamide shows limitations in the blowing phase because of its rather low melt strength which results in parison tear and failure in the blow molding process. High molecular weight modifiers can be used to increase the melt strength, provided however that (1) they can be easily dispersed within the thermoplastic, and (2) they do not increase the blend viscosity and limit the cycle time in the blow molding phase. Thus, there is a need in the art for a thermoplastic modifier that can be easily dispersed and that does not substantially increase the blend viscosity versus traditional modifiers. The invention herein addresses this need by selecting a particular EPDM composition to be grafted and then blended with the thermoplastic. This combination meets the desired EPDM/thermoplastic blend properties without the expected increase in melt viscosity. Moreover, the selected EPDM composition shows increased grafting efficiency versus traditional EPDM compositions having comparable structures.

Art Disclosed for United States Purposes Includes:
JP 04220409 which discloses grafting styrene/acrylonitrile mixture onto a blend of EPDM's of differing glass transition temperatures and U.S. Pat. No. 5,374,364 which discloses grafting EPDM with various monomers including crotonaldehyde.

SUMMARY OF THE INVENTION

This invention relates to a composition comprising an ethylene-higher α-olefin polymer composition grafted with at least 0.05 weight %, preferably at least 1 weight %, based upon the weight of the polymer, of an unsaturated organic compound containing at least one carbonyl group, wherein-the ethylene-higher α-olefin composition comprises:
i) a first polymer fraction having a number average molecular weight of from 10,000 to 500,000, an ethylene content of from 30 to 80 weight % and a diene content of from 1.0 to 12 weight %, based upon the weight of the polymer; and
ii) a second polymer fraction having a number average molecular weight of from 100,000 to 10,000,000, an ethylene content of from 40 to 90 weight % and a diene content of from 0 to 12 weight %, based upon the weight of the polymer; provided that:
a) the second fraction has a higher molecular weight than the first fraction,
b) the second fraction has an equal or higher ethylene content than the first fraction,
c) the weight ratio of diene in the first fraction to diene in the second fraction is at least 0.5/1, preferably 1/1, more preferably 2/1,
d) the Mw/Mn of each fraction is independently from 2 to 6.5, and
e) the first fraction comprises 60 to 95 weight % of the total polymer composition.

This invention further relates to blends comprising the composition described above and one or more polymers selected from the group consisting of polyamides, polypropylenes, polyethylenes, ethylene-propylene copolymers, and ethylene-propylene-diene copolymers.

BRIEF DESCRIPTION OF THE FIGURES

FIG. 5 shows the viscosity/shear rate behaviour of the two blends in Example 2. LEXT 3817 is a blend of grafted EPDM-2 from Example 1 with Ultramid B5 (80/20), and LEXT 3819 is a blend of EP-4 (CA-1801) with Ultramid B5 (80/20).

DETAILED DESCRIPTION OF THE INVENTION

Figure 1A:
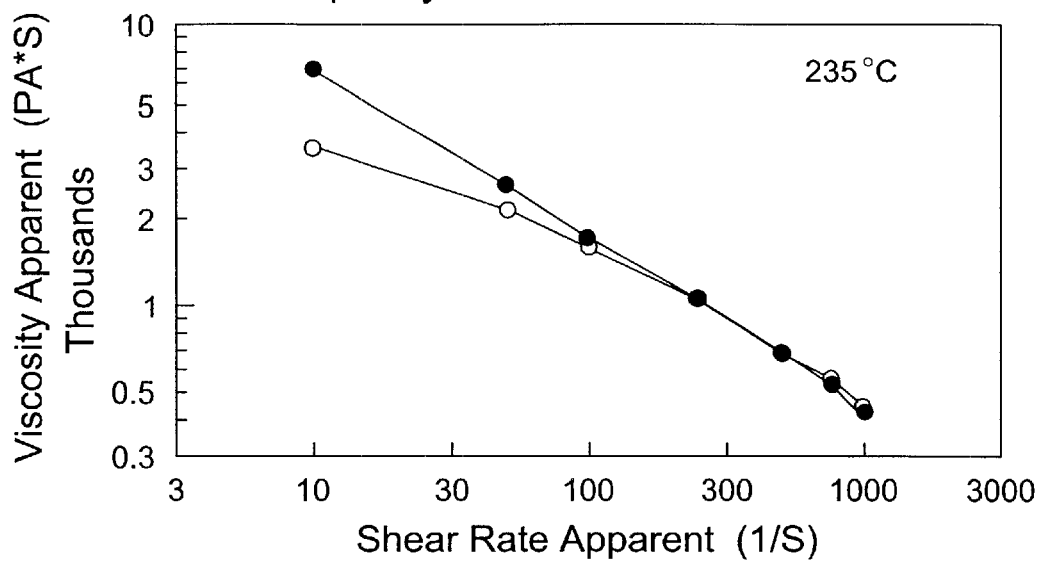
FIG. 1 shows the viscosity/shear rate curves for a grafted polymer according to the invention and a commercially available grafted EPM. (The squares are the grafted EPDM 2 from Example 2 and the triangles are EP 4 (VA-1801)).

In a preferred embodiment this invention relates to a composition comprising an ethylene-higher α-olefin polymer composition grafted with at least 0.05 weight %, preferably 0.05 to 5 weight %, even more preferably 0.2 to 3 weight %, based upon the weight of the polymer, of an unsaturated organic compound containing at least one carbonyl group, wherein the ethylene-higher α-olefin composition comprises:
i) a first polymer fraction having a number average molecular weight of from 10,000 to 500,000, an ethylene content of from 30 to 80 weight %, preferably 40 to 80 weight %, even more preferably 50–70 weight %, and a diene content of from 1 to 12 weight %, preferably 1.5 to 10 weight %, even more preferably 2 to 6 weight %, based upon the weight of the polymer; and
ii) a second polymer fraction having a number average molecular weight of from 100,000 to 10,000,000, preferably 200,000 to 1,000,000, an ethylene content of from 40 to 90 weight %, preferably 40 to 80 weight %, even more preferably 50–70 weight %, and a diene content of from 0 to 12 weight %, preferably 0 to 8 weight %, even more preferably 0 to 6 weight %, based upon the weight of the polymer; provided that:
a) the second fraction has a higher molecular weight than the first fraction,
b) the second fraction has an equal or higher ethylene content than the first fraction,
c) the weight ratio of diene in the first fraction to diene in the second fraction can vary from 0.5 to 1, from 2.0 to 1 or even more (when the second fraction has no diene the ratio is of course infinity), in preferred embodiments the ratio is at least 0.5 to 1, preferably at least 0.8 to 1, d) the Mw/Mn of each fraction is independently from 2 to 6.5, preferably 2 to 5, even more preferably 2 to 4 and e) the first fraction comprises 60 to 95 weight %, preferably 70–95 weight % of the total polymer composition.

Preferred ethylene-higher α-olefin polymer compositions used in this invention are more fully described in and can be prepared according to the procedures in EPA 0 227 206 B1 (which is equivalent to U.S. Pat. No. 4,722,971). In general, however the ethylene-higher α-olefin polymers are copolymers of ethylene and a $C_3$ to $C_8$ α-olefin, preferably propylene and an optional diene, preferably a non-conjugated diene. Preferred dienes include straight chain alicyclic dienes (such as 1,4 hexadiene), branched chain dienes, acyclic dienes (such as 5-methyl-1,6-hexadiene), single ring alicyclic dienes (such as 1,4-cyclohexadiene), multi ring alicyclic fused and bridged ring dienes (such as dicyclopentadiene), bridged ring dienes (such as alkenyl, alkylidene, cycloalkenyl and cycloalkylidene norbornenes) and the like. Particularly preferred dienes include 5-ethylidene-2-norbornene, methylene norbornene and vinyl norbornene.

In a preferred embodiment these ethylene-higher α-olefin composition polymers have a branching index between 0.1 and 0.8, more preferably between 0.2 and 0.7.

The ethylene-higher α-olefin polymer compositions are chemically modified by reaction with an unsaturated organic compound containing at least one carbonyl group. The term "graft" shall mean the process of reacting the unsaturated organic compound and the ethylene-higher α-olefin polymer and an optional free radical initiator and the term "grafted polymer" shall mean the product of the reaction between the unsaturated organic compound and the ethylene-higher α-olefin polymer. The grafting may be accomplished by any technique known in the art such as those disclosed in U.S. Pat. Nos. 3,236,917; 4,950,541 and 5,194. Typically, the polymer to be grafted, the unsaturated organic compound and an optional free radical initiator are all introduced into a reaction zone, heated and or mixed and allowed to react. One of the many possible methods to graft the ethylene-higher α-olefin polymer compositions would be introducing the polymer into a mixing device, such as a single or twin screw extruder or an internal mixer, heating the polymer until it is molten, injecting the unsaturated organic compound and the free radical initiator into the mixing device and mixing the components under high or low shear conditions. The unsaturated organic compounds may be added as a neat compound, as part of a master batch, or as a supported compound. The support is typically a polymer but may be any of the well known inorganic supports.

Typical free radical agents include well known peroxides, such as the dialkyl peroxides, (dicumylperoxide, 2,5-dimethyl-2,5bis(tertbutylperoxy)hexene-3, tertio butylcumylperoxide, 2,5-dimethyl-2,5bis(tertbutylperoxy) hexene, diacylperoxide (dibenzoyl peroxide, dilauryl peroxide), peroxyesters (tert butyl peroxyacetate, tert butyl peroxypivalate, AIBN (azoisobisbutyronitrile) peroxyketones, monoperoxycarbonates, and commercially available peroxides, such as the Lupersol™ products.

Unsaturated organic compounds containing at least one carbonyl group are those compounds containing at least one unsaturation and at least one carbonyl group (—C═O). Representative compounds include the carboxylic acids, anhydrides, esters and their salts, both metallic and non-metallic. Preferred compounds contain ethylenic unsaturation conjugated with a carbonyl group. Preferred examples include maleic acid, fumaric, acrylic, methacrylic, itaconic, crotonic, a-methyl crotonic and cinnamic acids, their anhydride, ester and salt derivatives, as well as glycidylmethacrylate, glycidyl acrylate or other glycidyl compounds. Maleic anhydride is a preferred unsaturated organic compound.

A desirable aspect of this invention is that the ethylene-higher α-olefin polymers described above typically have an unexpectedly good grafting efficiency of at least 20%, preferably 30%, even more preferably at least 40% better than comparable monomodal branched EPDM terpolymers. Grafting efficiency is the weight of the organic compound grafted as determined by FTIR divided by the weight of the organic compound fed to the extruder.

In a particularly preferred embodiment the grafted polymer produced herein typically has the desirable combination of 1. a melt flow rate (MFR, as measured by ASTM D 1238 10 kg, 230° C.) of 3 g/10 min or less, preferably 0.2 to 3, even more preferably 0.2 to 1, and
2. a low shear rate viscosity, (as measured by capillary rheometer at 235° C. and at a shear rate of 10 sec$^{-1}$ according to ASTM 3835-95) above 4000 Pa·sec, preferably above 5000 Pa·sec, and
3. a high shear rate viscosity, (as measured by capillary rheometer at a shear rate of 1000 sec$^{-1}$ according to ASTM 3835-95 )of 1000 Pa·sec or less, preferably below 500 Pa·sec, and
4. a level of unsaturated organic compounds of 0.5 to 20 weight %, based upon the weight of the copolymer. The unsaturated organic compounds content is measured by FTIR (Fournier Transformed Infrared spectroscopy). The reaction products are compressed at t°≈165° C. into thin films from which infrared spectra were taken using a Mattson Polaris Fourrier Transformed Infrared spectrometer at 2 cm$^{-1}$ resolution with the accumulation of 100 scans. The relative peak height of the anhydride absorption bond at 1790 cm$^{-1}$ and of the acid absorption (coming from the anhydride hydrolysis in the air) at 1712 cm$^{-1}$ compared with a bond at 4328 cm$^{-1}$ serving or internal standard or taken or a measurement of the MA content.

$$\% MA = k \frac{A1790 + A1712}{A4328}$$

k being determined * internal calibration with standard.

5. a gel level of 5% or less preferably 3% or less even more preferably of 1% or less, most preferably of 0%I(as measured by extraction with refluxing xylene in a soxlet for 8 hours).

The grafted polymer may then be blended with one or more additional polymers. Preferred additional polymers include plastics [HDPE (High density polyethylene), LDPE (low density polyethylene), LLDPE (linear low density polyethylene), VLDPE (very low density polyethylene), PP (polypropylene)]; elastomers [ethylene-propylene copolymers, ethylene propylene diene terpolymers, ethylene α-olefin copolymers, polyisobutylene, polybutene, butyl rubber, halobutyl rubber, polyisobutylene co-paramethylstyrene rubber, brominated polyisobutylene co-paramethyl styrene rubber, nitrile rubber, natural rubber, styrene butadiene rubber, epichlorhydrin, chlorinated polyethylene, ethylene acrylic acid acrylic ester rubber];

plastomers [ethylene α-olefin copolymers]; engineering thermoplastics [polyamide, polybutylene terephtalate, polyethylene terephtalate, polycarbonate, polyacetal), PVC (polyvinyl chloride), ethylene non α-olefin copolymers, EAA (ethylene acrylic acid copolymers), EMA (ethylene methyl acrylate copolymers), EVA (ethylene vinyl acetate)]; ionomers, [EVOH (ethylene vinyl alcohol copolymers), ECO (ethylene carbon monoxide copolymer)]; and the like.

The grafted polymer and the additional polymers may be combined by any means known in the art such as melt blending, dry blending, tumble mixing, barrel mixing, single or twin screw extrusion, mixing on a Banbury mixer, and the like, with melt blending being preferred. The amount of the components in the blend will depend on the application and desired end use. For example for blow molded uses the grafted polymer is present at 5 to 40, preferably 10 to 30 weight % based upon the total weight of the grafted polymer and the additional polymer.

A particularly advantageous use for the grafted polymers of this invention includes use as modifiers for polyamide (PA)based compositions. These grafted polymers can be used as modifiers for PA toughening where they show superior impact strength at room temperature. More specifically they can be used in glass filled PA compounds developed for blow molding applications. One of the grafted polymers' attractive properties resides in their rheology. These polymers, being shear sensitive, show higher viscosity at low shear rate and lower viscosity at high shear rates. When blended with high number average molecular weight PA, the blend also displays a shear thinning behaviour. At low shear rates, typical of the blowing phase, the blend has a high viscosity which will translate in a higher melt strength. These blends will thus show an increased resistance to failure and tear during the blowing operation. At high shear rates, typical for injection molding, the blend has a similar viscosity to blends containing a lower viscosity linear ethylene propylene rubber grafted with maleic anhydride and has thus no processing penalty. The grafted polymers can also be used in thermoset compounds as adhesion promoters to flock or to aramid fibers. Finally another application is their use in thermoplastic elastomer blends with polyamides where after blending, these polymers could be vulcanized to give a dynamically vulcanized alloy. Dynamically vulcanized alloys and process to make them are described in U.S. Pat. Nos. 5,157,081; 5,100,947; 5,073,597; and 5,051,478.

The ethylene-higher α-olefin polymers described herein give higher grafting (as compared to traditional highly branched EPDM's) when melt reacted with a peroxide and an unsaturated compound containing both an unsaturation and a conjugated carbonyl function. These grafted polymers are highly shear sensitive and are thus ideal modifiers for the production of blow molded toughened thermoplastic parts where high viscosity at low shear rate and low viscosity at high shear rate are suitable.

EPDM polymers having long chain branching show lower grafting levels versus linear EPDM when melt reacted with an unsaturated compound and a peroxide. Surprisingly, the ethylene-higher α-olefin polymers described herein which it is believed also have long chain branching show 30–40% increase in grafting efficiency when reacted under the same conditions.

Number average molecular weight of the second fraction can be calculated according to the equation $Mn_T = Mn_{F1}^{\alpha} * Mn_{F2}^{(1-\alpha)}$ where $Mn_T$ is the number average molecular weight of the final polymer, $Mn_{F1}$ the number average molecular weight of the first fraction, $Mn_{F2}$ is the number average molecular weight of the second fraction and α is the weight percent of the first fraction.

EXAMPLES

Flexural modules was measured according to DIN 53457.
Tensile properties were measured according to DIN 53457.
Notched Izod Impact was measured according to ISO 180.
Notched Charpy Impact was measured according to ISO 179.
MVR (melt volume rate) was measured according to ISO 1133.
MFR (melt flow rate) was measured according to ASTM D 1238, (230° C., 10 kg).
Viscosity is measured by capillary rheometer according to ASTM 3835-95
Mw and Mn are measured by gel permeation chromatography using polyisobutylene standards on a Waters 150 gel permeation chromatograph detector and a Chromatix KMX-6 on line light scattering photometer. The system is used at 135° C. with 1,2,4-trichlorobenzene as the mobile phase. Showdex (from Showa Denks America, Inc.) polystyrene gel columns 802, 803, 804 and 805 were used. This technique is discussed on "Liquid Chromatography of Polymers and Related Materials III" J. Cazes editor, Marcel Dekker, 1981. No corrections for column spreading were employed. Mw/Mn was calculated from elution times. The numerical analyses were performed using the commercially available Beckman/CIS LALLS software in conjunction with the standard Gel Permeation package. The branching index (BI) of a ethylene-higher α-olefin diene is determined using a branching index factor. Calculating this factor requires a series of three laboratory measurements of polymer properties in solution. (See Verstrate, Gary, "Ethylene-Propylene Elastomers," Encyclopedia of Polymer Science and Engineering, 6, second edition, 1986) These are:

i) weight average molecular weight(Mw, LALLS) measured using low angle laser light scattering (LALLS) technique subsequent to a gel permeation chromatograph (GPC);

ii) weight average molecular weight(Mw, DRI) and viscosity average molecular weight, (Mv, DRI) using a differential refractive index detector (DRI) with GPC and iii) inherent viscosity (IV) measured in Decalin at 135° C.

The first two measurements are obtained in a gel permeation chromatograph (GPC) using a filtered dilute solution of the polymer in tri-chloro benzene. An average branching index (BI) is defined as:

$$BI = ((Mv,br) \times (Mw,DRI)) + ((Mw,LALLS) \times (Mv,DRI))$$

where $Mv,br = k(IV)^{1/a}$; $Mv,br$ is viscosity average molecular weight for branched polymer and "a" is the Mark-Houwink constant (=0.759 for an ethylene, α-olefin, non-conjugated diene elastomeric polymer in decalin at 135° C.) "k" is a constant with a value of $2.47 \times 10^{-4}$.

From the equation if follows that the branching index for a linear polymer is 1.0 and for branched polymers the extent of branching is defined relative to the linear polymer. Since at a constant Mn, $(Mw)_{branch}$ is greater than $(MW)_{linear}$, BI for a branched polymer is less than 1.0, an a smaller BI value denotes a higher level of branching. It should be noted that this method is only indicative of the relative degree of branching and not a quantified amount of branching as would be determined using a direct method such as NMR.

EPDM 1 is an ethylene-propylene ethylidene norbornene terpolymer having an MFR of 1.0 g/10 min, an ethylene content of 62 wt %, a diene content of 5.7 wt %, an Mw/Mn of 2.8 and a BI of 0.7.

EPDM 2 is an ethylene-propylene-ethylidene norbornene terpolymer having an MFR of 0.3 g/10 min, an ethylidene norbornene content of 5.7 wt %, an Mw/Mn of 3.2 and a BI of 0.6, a low shear rate (10 sec$^{-1}$) viscosity of 20,000 Pa·s at 235° C. and a high shear rate (1000 sec$^{-1}$) viscosity of 700 Pa·s at 235° C. EPDM 2 also has 55 wt % ethylene, and 5.7 wt % diene in first fraction, 55 wt % ethylene and 5.7 wt % diene in the second fraction, an Mn in the first fraction of 67,000, an Mn in the second fraction of 300,000, an Mw/Mn of 5 in the first fraction and an Mw/Mn of 4.7 in the second fraction.

EPDM 3 is a bimodal EPDM having an MFR of 1.3 g/10 min, an ethylene content of 50%, a diene content of 5.7 weight %, an Mw/Mn of 3.5 and a BI of 0.6.

Ultramid B3™ is a polyamide—6 polymer available from Bayer having an MVR (melt volume rate) at 275° C., under a weight of 5 kg, of 130 ml/min.

Ultramid B5™ is a high molecular weight polyamide—6 polymer available from Bayer having an MVR (melt volume rate) at 275° C., under a weight of 5 kg, of 8 ml/min.

EP 4 (VA 1801) is an ethylene-propylene copolymer having an MFR of 9 g/10 min grafted with 0.7 weight % of maleic anhydride.

Example 1

EPDM 2 and 3 were compared to a traditional long chain branched EPDM polymer (EPDM 1) (Table 1). These polymers were melt functionalized on a non-intermeshing counter-rotating twin screw extruder (30 mm, L/D=48) under the following conditions: 94–96 weight % of the EPDM, 4–6 weight % of Accurel MA 903 (50% maleic anhydride in PE), 0.8 to 1.5 weight % of a 10% solution of Luperox 130, at a polymer feed rate of 7 kg/hr, a screw speed of 200 rpm, over four temperature zones of 170, 200, 210, 210° C. with the die at 200° C. The polymers were added to the feed hopper with maleic anhydride which was PE supported (50 wt %); after melting, the peroxide (LUPEROX™ 130) at a 10% concentration in mineral oil was added. Excess reagents were removed with vacuum prior to polymer recovery. The conversions, reported in table 2, indicate that the grafting of EPDM's 2 and 3 is more efficient than the grafting of the EPDM 1.

Figure 1B:
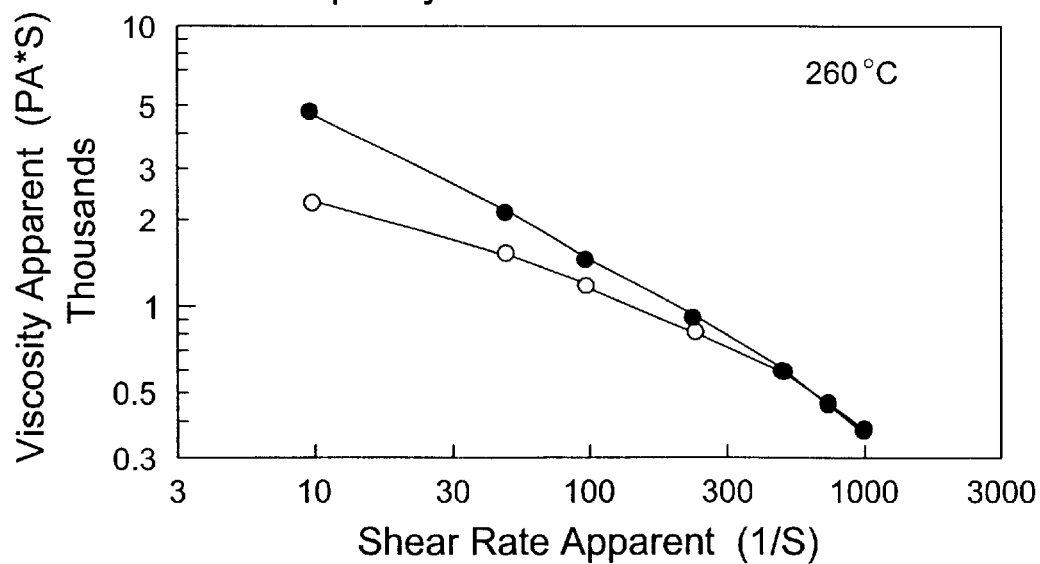

A grafted EPDM 2 (MFR 1.1 g/10 min (230° C., 10 kg) having 0.9 weight % maleic anhydride) was then blended with Ultramid B3 at 15 and 20 weight %. The viscosity/shear rate curves for both compositions are presented in FIG. 1 (squares are the EPDM 2 (grafted with maleic anhydride) and triangles are the EP 4 (VA1801)).

Figure 2A:
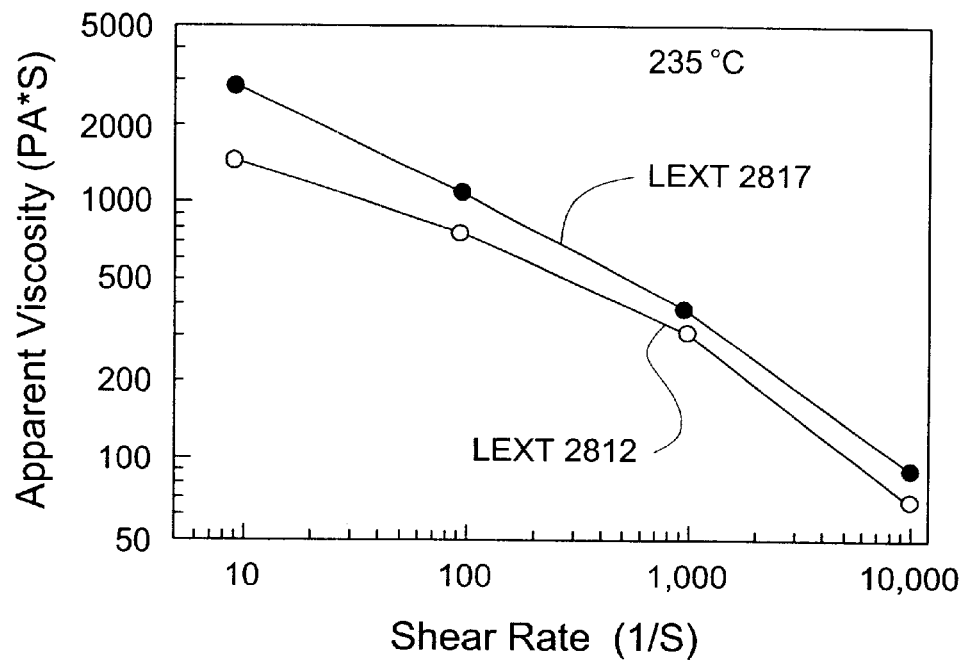
FIG. 2 shows the viscosity/shear rate curves for blends of Example 2. LEXT 2817 is a blend of the grafted EPDM 2 from Example 2 with PA-6 in an 80/20 ratio and LEXT 2812 is a blend of EP 4 (VA-1801) with PA-6 in an 80/20 ratio.
Figure 2B:
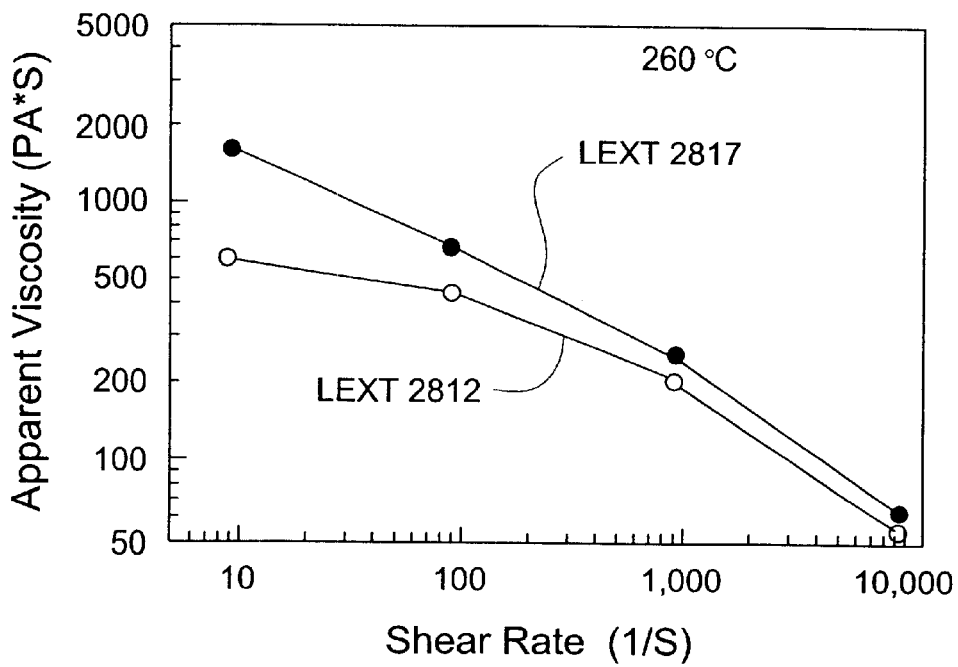
Figure 3:
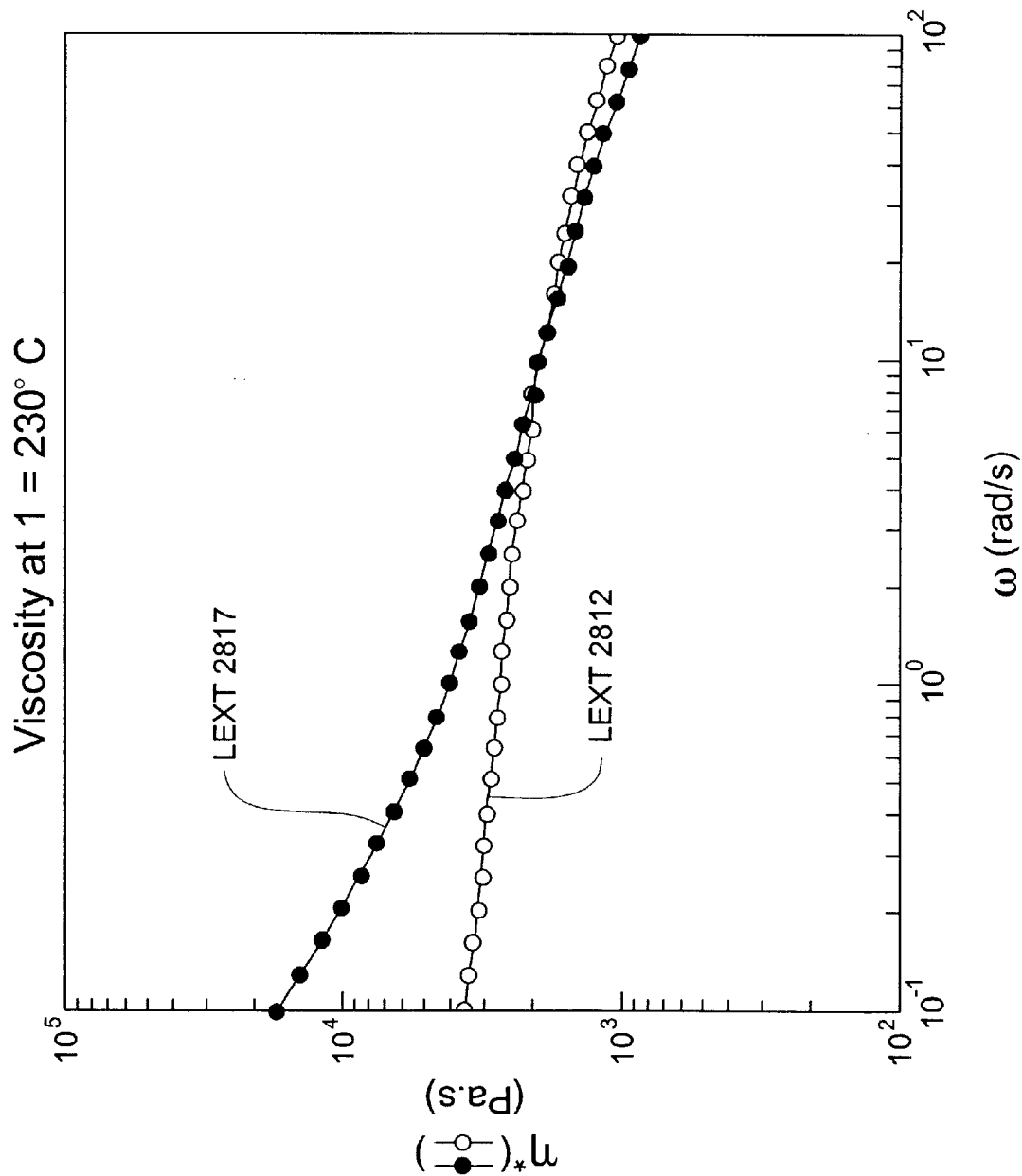
FIG. 3 shows the complex viscosity/shear rate curves for blends of Example 2.
Figure 4:
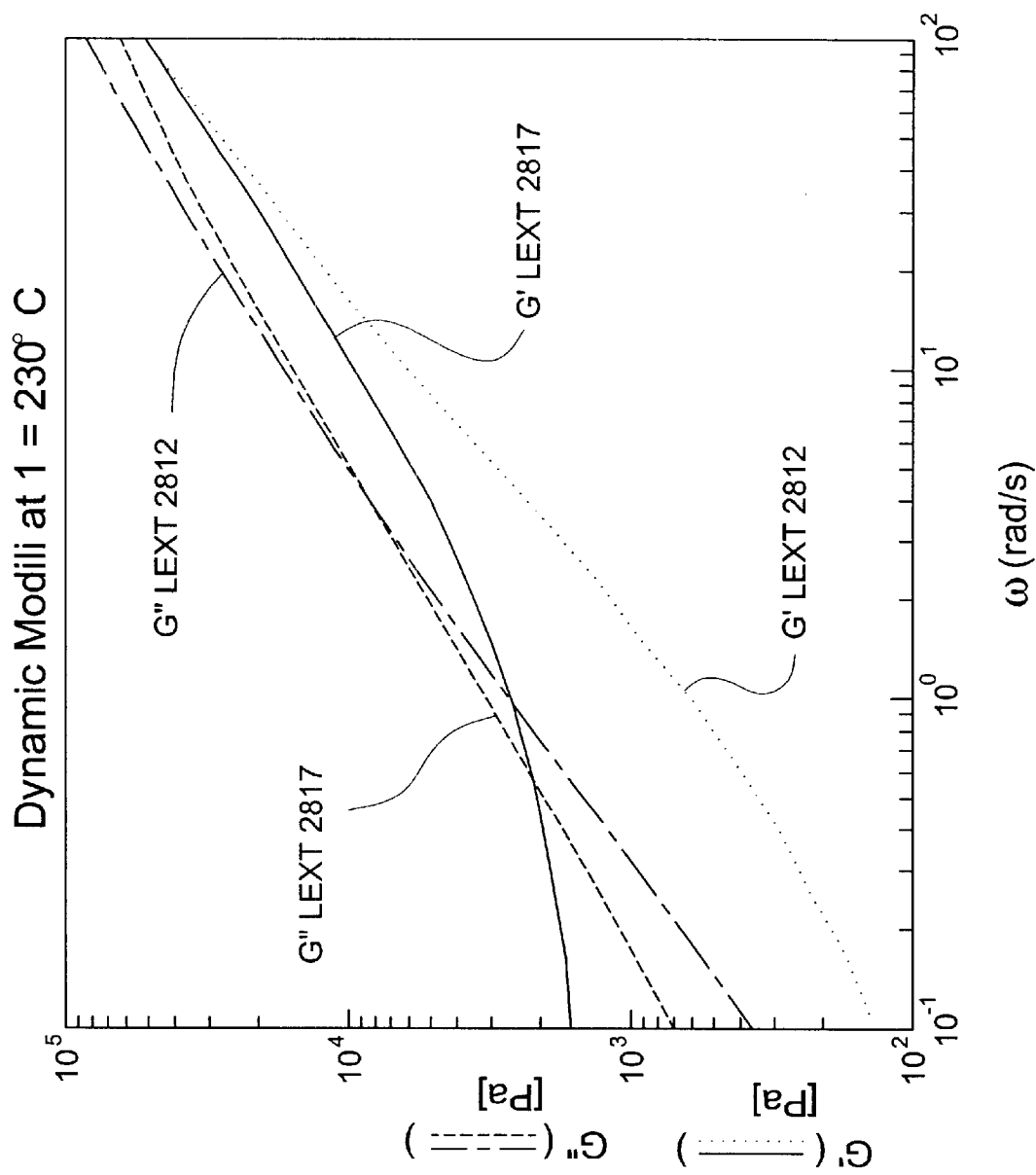
FIG. 4 shows dynamic moduli of the blends of Example 2.

The two grafted polymers were blended with Ultramid B3 on an intermeshing co-rotating twin screw extruder (34 mm, L/D=36) according to the following conditions: 80 and 85 weight % of the Ultramid B3, 20 and 15 weight % of the grafted polymer, at a feed rate of 10 kg/hour, a screw speed of 100 rpm over ten temperature zones set at the following temperatures (° C.) 230, 230, 230, 230, 210, 210, 210, 210, 210, 230. The viscosity/shear rate behaviour of the two blends are depicted in FIGS. 2 and 3. The former figure is generated by measuring the viscosities on a capillary rheometer at 235° C. with a 20/1 L/D die whereas the later one is generated from small amplitude oscillatory measurement performed on a Rheometrics Mechanical Spectrometer (RMS-800) at 230° C. Both figures confirm the higher viscosity of the grafted EPDM 2 blend at low shear rates whereas a much lower difference is observed at higher shear rates. Comparison of the dynamic shear modulus of the two blends also shows a much higher value for the grafted EPDM 2 blend. As a result this blend will show higher melt strength and higher resistance to failure versus the blend with the traditional modifier. The blends were then tested for Notched Izod impact strength and Notched Charpy impact. The grafted EPDM 2 also confers higher room temperature impact strength to the blend versus the traditional modifier (see table 3).

TABLE 1

|  | EPDM 1 | EPDM 2 | EPDM 3 |
|---|---|---|---|
| ML$_{(1+4)}$, 125° C. | 52 | 89 | 54 |
| wt % ethylene | 62 | 50 | 50 |
| wt % ENB | 5.7 | 5.7 | 5.7 |
| Mw/Mn (DRI) | 2.8 | 3.2 | 3.5 |
| BI | 0.7 | 0.6 | 0.6 |

BI = branching index
ENB = 5-ethylidene-2-norbornene

TABLE 2

(Grafting Efficiency)

|  | EPDM 1 | | EPDM 2 | | | EPDM 3 | |
|---|---|---|---|---|---|---|---|
| MA feed % | 2 | 3 | 3 | 2 | 3 | 3 | 2 | 3 |
| Peroxide feed % | 0.08 | 0.12 | 0.15 | 0.08 | 0.12 | 0.15 | 0.08 | 0.15 |
| Temp. (° C.) | 201–200 | 209–210 | 201–207 | 200–207 | 202–210 | 201–210 | 199–208 | 198–209 |
| MFR g/10 min (230° C. 10 kg) | 1.6 | 2.06 | 1.04 | 1.0 | 0.94 | 0.75 | 0.1 | 0.7 |
| MA wt % (a.o.) | 0.54 | 0.88 | 1.11 | 0.79 | 1.24 | 1.4 | 0.82 | 1.26 |
| Grafting Efficiency (%) | 27 | 29 | 37 | 40 | 41 | 47 | 41 | 42 | a.o. = after oven

TABLE 3

(Blend Properties)

|  | EP 4 (VA-1801)-20% UB3 - 80% | EPDM 2 (-g-MA)-20% UB3 - 80% | EP 4 (VA-1801)-15% UB3 - 85% | EPDM2 (-g-MA)-15% UB3 - 85% |
|---|---|---|---|---|
| Notched Izod Impact (kJ/m$^2$) room temp | 75 | 100 | 81 | 101 |
| Notched Izod Impact (kJ/m$^2$) 0° C. | 71 | 93 | 53 | 83 |
| Notched Charpy Impact (kJ/m$^2$) room temp | 49 | 60 | 43 | 58 |
| Notched Charpy Impact (kJ/m$^2$) 0° C. | 37 (nb) | 52 | 21 (b) | 27 (b) | nb = no break
b = break
UB3 is Ultramid B3

Another benefit of this invention is the grafting efficiency of the polymers described herein. In a preferred embodiment the polymer has a grafting efficiency of 35% or more, preferably 40% or more, even more preferably 45% or more.

Example 2

Grafted EPDM 2 and EP-4 were blended with Ultramid B5 according to the procedure described in Example 1, except that the temperature profile was 260-260-260-230-230-230-230-230-230-260° C. and screw speed was 150 rpm. The blends were then tested for Notched Izod impact strength and Notched Charpy impact and other properties. The data are reported in Table 4.

TABLE 4

| | | Ultramid B5 EPDM-2(-g-MA) (80/20) | Ultramid B5 EP4(VA 1801) (80/20) |
|---|---|---|---|
| Flex. Mod. cond. | MPa | 1686 | 1648 |
| Flex. Mod. dam. | MPa | 1718 | 1668 |
| Tensile properties on samples cond. | | | |
| Stress at Maxload | Mpa | 58 | 52 |
| Stress at break | Mpa | 57 | 52 |
| El. at break | % | 99 | 114 |
| E-modulus | MPa | 1854 | 1796 |
| Tensile properties on samples dam. | | | |
| Stress at Maxload | Mpa | 57 | 50 |
| Stress at break | Mpa | 56 | 47 |
| El. at break | % | 94 | 82 |
| E-modulus | MPa | 1955 | 1871 |
| Notched | | | |
| Izod RT dam. | kJ/m$^2$ | 128 | 86 |
| Izod RT (cond.) | kJ/m$^2$ | 119 | 69 |
| Izod 0° C. | kJ/m$^2$ | 131 | 108 |
| Izod −10° C. | kJ/m$^2$ | 134 | 111 |
| Izod −20° C. | kJ/m$^2$ | 132 | 105 |
| Izod −30° C. | kJ/m$^2$ | 120 | 92 |
| Izod −40° C. | kJ/m$^2$ | 27* | 21* |
| Notched | | | |
| Charpy RT dam. | kJ/m$^2$ | 56 | 34 |
| Charpy RT (cond.) | kJ/m$^2$ | 72 | 53 |
| Charpy 0° C. | kJ/m$^2$ | 64 | 47 |
| Charpy −10° C. | kJ/m$^2$ | 63 | 51 |
| Charpy −20° C. | kJ/m$^2$ | 58 | 44 |
| Charpy −30° C. | kJ/m$^2$ | 43 | 32 |
| Charpy −40° C. | kJ/m$^2$ | 19* | 21* |
| MFR 275° C./2.16 kg | g/10 min | 0.05 | 0.28 |
| MFR 275° C./5.00 kg | g/10 min | 0.41 | 1.61 |
| MFR 275° C./10.00 kg | g/10 min | 1.7 | 5.9 |
| MFR 275° C./21.16 kg | g/10 min | 8.6 | 26 |

* = samples broken

Note from Table 4 that the EPDM 2 blend has better notched Izod impact from room temperature down to −40° C. compared to the VA-1801 or EP-4.

The viscosity shear rate behaviour of the two blends is depicted in FIG. 5. The figure was generated from small amplitude oscillatory measurements performed on a Rheometrics Mechanical Spectrometer (RMS-800) at 260° C. FIG. 5 confirms the higher viscosity of the grafted EPDM 2 blend at low shear rates whereas a much lower difference is observed at higher shear rates.

As is apparent from the foregoing general description and the specific embodiments, while forms of the invention have been illustrated and described, various modifications can be made without departing from the spirit and scope of the invention. Accordingly, it is not intended that the invention be limited thereby.

What is claimed is:

1. A polyamide blow molding process comprising blending polyamide with 5 to 40 weight percent of a composition comprising an ethylene-$C_3$ to $C_8$ α-olefin polymer composition grafted with at least 0.05 weight %, based upon the weight of the polymer, of an unsaturated organic compound containing at least one carbonyl group, wherein the ethylene-$C_3$ to $C_8$ α-olefin composition comprises:

i) a first polymer fraction having a number average molecular weight of from 10,000 to 500,000, an ethylene content of from 30 to 80 weight % and a diene content of from 1.5 to 10 weight %, based upon the weight of the polymer; and ii) a second polymer fraction having a number average molecular weight of from 100,000 to 10,000,000, an ethylene content of from 40 to 90 weight % and a diene content of from 0 to 8 weight %, based upon the weight of the polymer; provided that:

a) the second fraction has a higher molecular weight than the first fraction, b) the second fraction has an equal or higher ethylene content than the first fraction, c) the weight ratio of diene in the first fraction to diene in the second fraction is at least 0.5/1, d) the Mw/Mn of each fraction is independently from 2 to 6.5, and e) the first fraction comprises 95 to 60 weight % of the total polymer composition;

and blow molding the blend.

2. The process of claim 1 wherein the ethylene-α-olefin polymer has a branching index of 0.1 to 0.8.

3. The process of claim 1 or 2 wherein the grafted ethylene-α olefin polymer has a low shear viscosity of 5,000 Pa·sec or more, a high shear viscosity of 1,000 Pa·sec or less, and MFR of 3 g/10 min or less and a gel content of less than 5%.

4. The process of claim 1 wherein the grafted ethylene-α olefin polymer is grafted with at least 1 weight % of the unsaturated organic compounds.

5. The process of claim 1 wherein the polymer composition has a grafting efficiency of 35% or more.

6. The process of claim 1 wherein the blend further comprising glass fibers.

7. The process of claim 1 wherein the polymer composition has a melt flow rate of 3 g/10 min or less.

* * * * *